(12) United States Patent
Mukai et al.

(10) Patent No.: US 7,869,975 B2
(45) Date of Patent: Jan. 11, 2011

(54) METHOD OF ESTIMATING SUPPORT STATE OF AN ELECTRONIC APPARATUS HOUSING AND ELECTRONIC APPARATUS

(75) Inventors: Minoru Mukai, Tokyo (JP); Takahiro Omori, Kawasaki (JP); Daisuke Yamamoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 374 days.

(21) Appl. No.: 12/055,015

(22) Filed: Mar. 25, 2008

(65) Prior Publication Data
US 2009/0063083 A1 Mar. 5, 2009

(30) Foreign Application Priority Data
Aug. 27, 2007 (JP) ............... 2007-220281

(51) Int. Cl.
G06F 19/00 (2006.01)
(52) U.S. Cl. .................................... 702/109
(58) Field of Classification Search ............... 702/109, 702/141, 56; 73/488, 865.3; 331/2, 13
See application file for complete search history.

(56) References Cited

U.S. PATENT DOCUMENTS 5,138,872 A * 8/1992 Henderson ............... 73/64.41
7,653,510 B2 * 1/2010 Hirohata et al. ............ 702/181
2005/0031137 A1 * 2/2005 Browning et al. ............ 381/96

FOREIGN PATENT DOCUMENTS

| JP | 2004129120 A | 4/2004 |
|----|--------------|--------|
| JP | 2005006206 A | 1/2005 |
| JP | 2007-200508  | 8/2007 |
| JP | 2008139293 A | 6/2008 |

OTHER PUBLICATIONS

U.S. Appl. No. 12/056,020, filed Mar. 26, 2008, Kenji Hirohata.
Official Action dated Sep. 15, 2009 for corresponding Japanese patent application No. 2007-220281 (with English translation).

* cited by examiner

Primary Examiner—Bryan Bui
(74) Attorney, Agent, or Firm—Ohlandt, Greeley, Ruggiero & Perle, L.L.P.

(57) ABSTRACT

In a method of estimating one of mechanical supporting states of a housing for an electronic apparatus, a drive signal is supplied to an oscillation device from which first oscillation is applied to the housing. A sensor detects a second oscillation transferred through the housing in response to the first oscillation to generate an oscillation signal, and a measurement response characteristic is obtained based on the drive signal and the oscillation signal, and is compared with reference response characteristics which are correlated with the mechanical supporting states, respectively, to estimate one of the mechanical supporting states of the housing.

7 Claims, 9 Drawing Sheets

METHOD OF ESTIMATING SUPPORT STATE OF AN ELECTRONIC APPARATUS HOUSING AND ELECTRONIC APPARATUS

CROSS-REFERENCE TO RELATED APPLICATIONS

This application is based upon and claims the benefit of priority from prior Japanese Patent Application No. 2007-220281, filed Aug. 27, 2007, the entire contents of which are incorporated herein by reference.

BACKGROUND OF THE INVENTION

1. Field of the Invention

The invention relates to a method of estimating a supporting state of an electronic apparatus housing, and an electronic apparatus.

2. Description of the Related Art

In recent years, portable electronic apparatuses such as notebook personal computers and mobile phones have become widespread. Portable electronic apparatuses are not only used in the state of being placed on a flat surface such as a desktop, but also used in various forms or positions. For example, portable electronic apparatuses are used in the state of being held by hand, or mounted on soft objects such as the user's lap or carpets. Further, portable electronic apparatuses may be operated in various positions, such as special cases of being operated in the bag. As described above, since portable electronic apparatuses are used in various forms or positions, the mechanical supporting state of the housing of the electronic apparatus varies.

The mechanical supporting state of the housing of an electronic apparatus is important information for managing the operating state of the apparatus, in controlling heat radiation and controlling an auxiliary storage device such as a hard disk drive.

First, explained is an example in which heat radiation is controlled according to the mechanical supporting state of the housing. In electronic apparatuses, openings for taking and exhausting air are provided in the bottom portion of the housing, and the housing is generally supported by leg portions when the apparatus is used on a flat surface such as a desktop. As a result, there is a certain space between the desktop and the bottom surface of the housing, and heated exhaust air discharged from the openings is discharged through the space, and thereby heat in the apparatus is radiated. Therefore, the space functions as an air intake and exhaust path for heat radiation. On the other hand, when electronic apparatuses are used on a soft object such as the user's lap and carpet, it is not always ensured that there is a space between the soft object and the bottom surface of the housing, and the heat radiation property of the apparatus differs from that in the case of placing the electronic apparatus on a desktop.

Next, explained is a case where an auxiliary storage device such as a hard disk drive is controlled according to the supporting state of the electronic apparatus. Hard disk drives perform very sophisticated mechatronic control in which a magnetic head accesses a region on a storage disk while the storage disk is rotated at high speed. The mechanical characteristic differs between the case where the electronic apparatus is used on a stable flat surface such as a desktop and the case where the electronic apparatus is used in various positions such as in the bag, and it is necessary to change control of the hard disk drive according to the supporting state of the electronic apparatus.

In prior art, there is a method of estimating the supporting state of the housing by an acceleration sensor mounted on the housing, as a technique of estimating the supporting state of the housing of an electronic apparatus. The position or movement of the electronic apparatus is monitored by an acceleration sensor mounted on the electronic apparatus. JPA No. 2007-200508 (KOKAI) discloses a technique in which a magnetic head is retracted into a safe region outside the disk, when it is determined during the monitoring that an impact may be given to the hard disk drive. Although this prior technique has already gone into actual use, the prior technique only senses dynamic input from the outside of the electronic apparatus, and cannot estimate the supporting state of the housing in a static state. Thus, the prior technique is not always sufficient.

As described above, the method of estimating the supporting state of the housing of an electronic apparatus in prior art has the following problem. When an acceleration sensor is used alone, the acceleration sensor only senses dynamic input from the outside of the electronic apparatus. Therefore, it is impossible to estimate the supporting state of the housing in a static state or in an acceleration/deceleration state which is smaller than the sensitivity of the acceleration sensor, and the electronic apparatus is not always in a sufficient monitoring state. Further, there is no prior art or idea relating to a method of estimating the supporting state of the housing in a static state at practical cost.

BRIEF SUMMARY OF THE INVENTION

According to one aspect of the present invention, there is provided a method of estimating one of mechanical supporting states of a housing for an electronic apparatus, comprising:

supplying a drive signal to an oscillation device provided in the electronic apparatus to apply first oscillation to the housing;

sensing second oscillation on the housing, which is transmitted to the housing in response to the first oscillation to output a sensor signal obtaining a measurement response characteristic based on the drive signal and the sensor signal; and comparing the measurement response characteristic with reference response characteristics which are correlated with the mechanical supporting states, respectively, to estimate one of the mechanical supporting states of the housing.

According to another aspect of the present invention, there is provided an electronic apparatus comprising:

a housing configured to receive the electronic apparatus;

an oscillation device which generates first oscillation in accordance with a drive signal to apply the oscillation to the housing;

an oscillation sensor which senses second oscillation transmitted to the housing in response to the first oscillation to output a sensor signal;

an processing section which determines a measurement response characteristic based on the drive signal and the sensor signal;

a storing section which stores reference response characteristics which are correlated with mechanical supporting states of the electronic apparatus, respectively;

a comparing section which compares the measurement response characteristic with the reference response characteristics to determine one of the reference response characteristics; and estimating one of the supporting states of the housing in accordance with the one of the reference response characteristics.

DETAILED DESCRIPTION OF THE INVENTION

A method of estimating a supporting state of an electronic apparatus housing according to one embodiment of the present invention is explained below, with reference to drawings.

Figure 1:
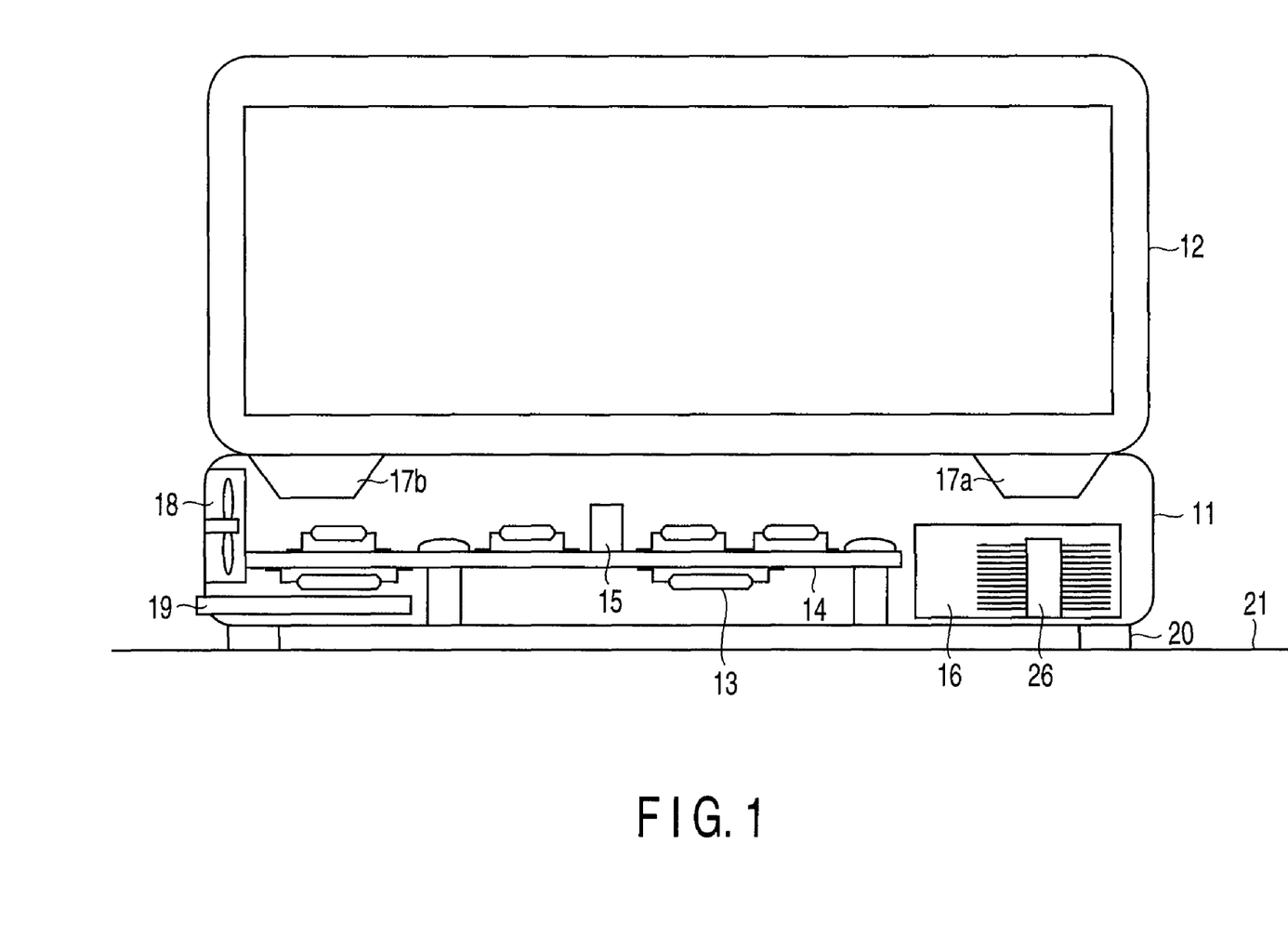
FIG. 1 is a schematic diagram illustrating a state where an electronic apparatus according to a first embodiment of the present invention is supported on a desktop.
Figure 2:
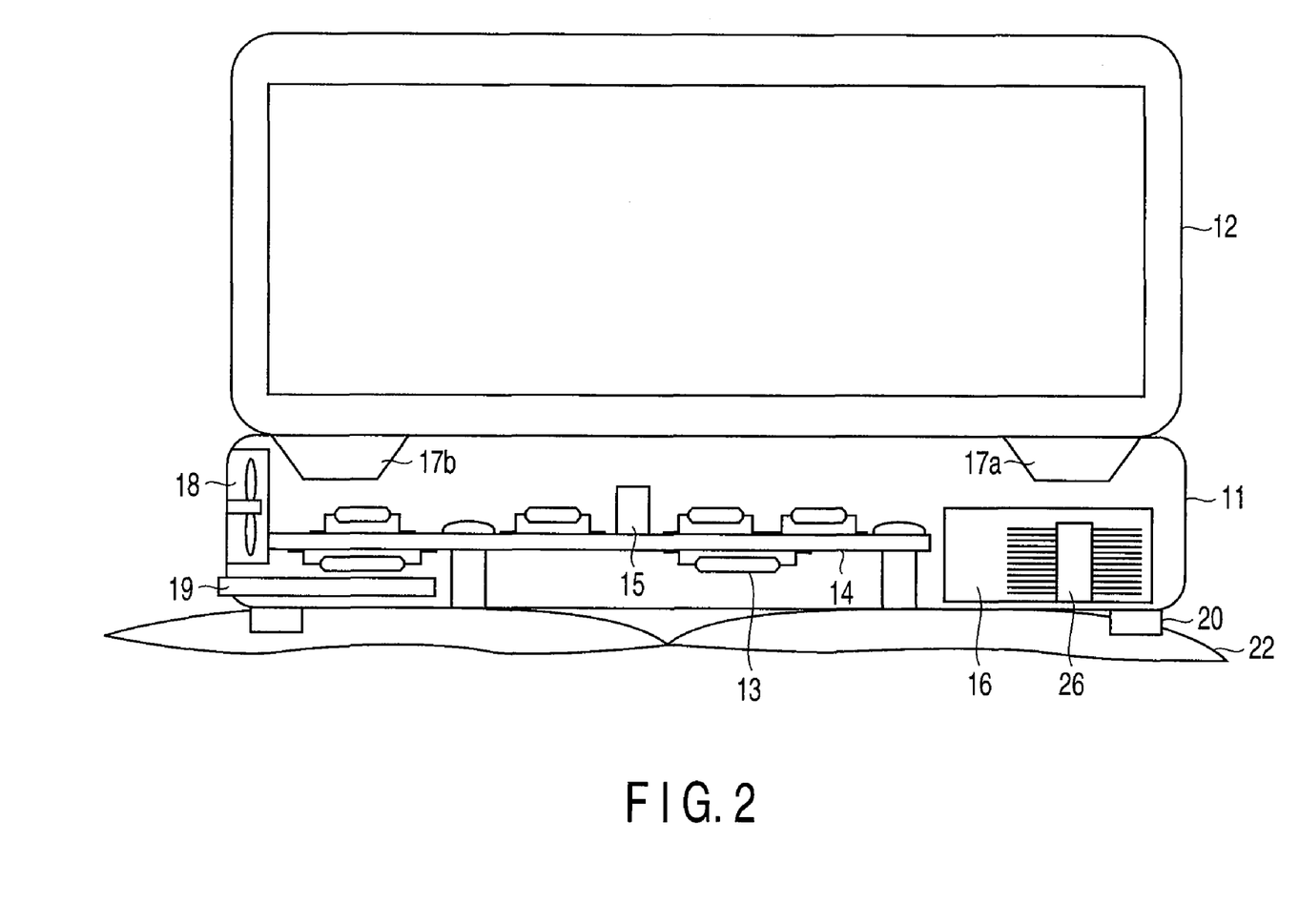
FIG. 2 is a schematic diagram illustrating a state where the electronic apparatus according to the first embodiment of the present invention is supported on user's lap.

FIGS. 1 and 2 are schematic cross-sectional views of a notebook personal computer serving as an electronic apparatus according to a first embodiment of the present invention, for explaining a method of estimating a supporting state of a housing of the notebook personal computer.

As illustrated in FIGS. 1 and 2, the notebook personal computer serving as the electronic apparatus comprises a housing 11, and a display panel 12 which is foldably coupled to the housing 11, as is well known. In the housing 11, a printed circuit board 14 equipped with electronic parts 13 such as semiconductor is fixed by screws or the like. An acceleration sensor 15 which senses the acceleration of the electronic apparatus is also mounted on the printed circuit board 14 like other electronic parts. Further, in the main body housing 11, fixed are a hard disk drive 16, speakers 17a and 17b, a cooling fan 18, and a card slot 19 to which an attachment is added. Further, leg portions 20 are provided on a bottom surface of the main body housing 11. As illustrated in FIG. 1, the notebook personal computer is used in the state of being placed on a flat surface 21 such as a desktop by the leg portions 20. However, as illustrated in FIG. 2, there are cases where the notebook personal computer is in the supporting state of being used on the user's lap. The oscillation characteristic of the housing 11 differs as described below, between the housing supporting state illustrated in FIG. 1 and the housing supporting state illustrated in FIG. 2.

Figure 3:
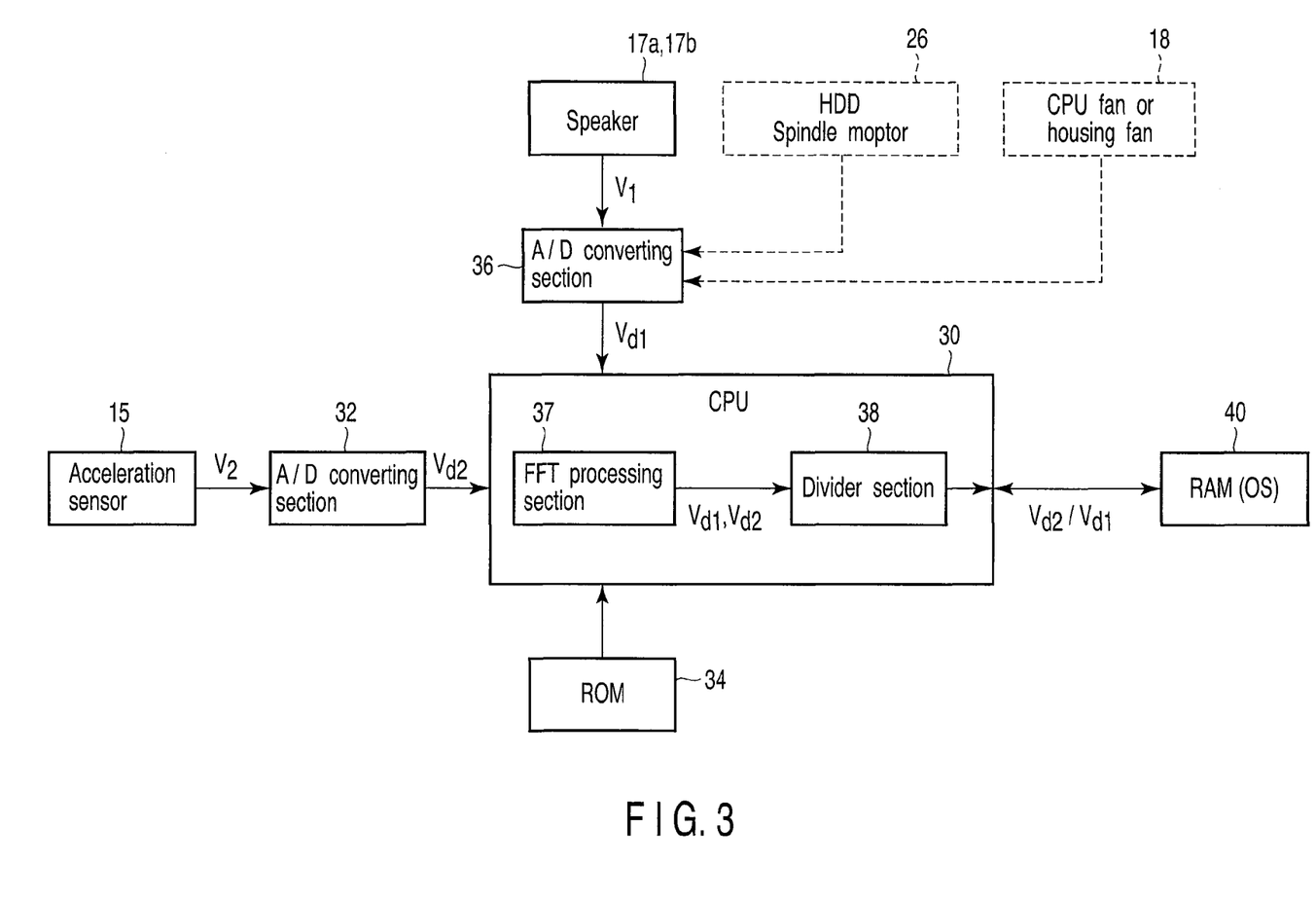
FIG. 3 is a block diagram illustrating circuits of the electronic apparatus illustrated in FIGS. 1 and 2.

FIG. 3 is a block diagram illustrating the speakers 17a and 17b and the hard disk drive 16, which serve as the oscillation source oscillating the housing 11 used for estimating the supporting state of the housing of the notebook personal computer illustrated in FIGS. 1 and 2. As illustrated in FIG. 3, the notebook personal computer has the hard disk drive 16 and the cooling fan 18, and oscillation of the speakers 17a and 17b is transmitted to the housing 11 and the printed circuit board 14. In the same manner, when the hard disk drive 16 is operated, oscillation generated from a spindle motor thereof is transmitted to the housing 11 and the printed circuit board 14. When the housing fan 18 attached to the housing 11 for cooling the housing 11 or a CPU fan (not shown) for cooling a CPU 30 is operated, oscillation from the housing fan 18 or the CPU fan is transmitted to the housing 11 and the printed circuit board 14 in the same manner.

Since oscillation generated from the speakers 17a and 17b is determined by determining the frequency of a drive signal v1 (voltage signal v1) which drives the speakers 17a and 17b, the drive signal v1 supplied to the speakers 17a and 17b is supplied to an A/D converting section 36 as an oscillation signal from the oscillation source. The oscillation signal depending on the drive signal v1 is converted into a digital oscillation signal vd1 by the A/D converting section 36, and supplied to the CPU 30. Even when the oscillation source is the hard disk drive 16, the housing fan 18 or the CPU fan, when the oscillation source is determined and operated, a drive signal v1 which drives the oscillation source is supplied to the A/D converting section 36 as an oscillation signal from the oscillation source. The oscillation signal depending on the drive signal v1 is also converted into a digital oscillation signal vd1 by the A/D converting section 36, and supplied to the CPU 30.

Further, the oscillation transmitted from the oscillation source to the housing 11 and/or the printed circuit board 14 is modulated according to the supporting state of the housing 11, and transmitted to the acceleration sensor 11. The transmitted oscillation is detected by the acceleration sensor 15 as acceleration. An acceleration signal v2 detected by the acceleration sensor 15 is converted into a digital acceleration signal vd2 by an A/D converting section 32, and supplied to the CPU 30. The acceleration signal v2 corresponds to a response to oscillation generated from the signal source. The response is also changed when the state of the housing 11 is changed.

The CPU 30 is supplied with a control program from a ROM 34, and operated under an OS provided to a RAM 40 from the outside. Further, the RAM 40 stores a program which executes a method of estimating the supporting state explained below. According to the program, the CPU 30 functionally forms a fast-Fourier transform processing section (FET processing section) 37 and a divider section 38, and stores the operation result in the RAM 40 and performs the estimation method explained below. The digital oscillation signal vd1 and the digital acceleration signal vd2 supplied to the CPU 30 are supplied to the fast-Fourier-transform processing section (FET processing section) 37, and converted into Fourier signals V1 and V2, respectively. Then, a frequency response function Vd2/Vd1 is determined by the divider section 38 based on the signals. The frequency response function Vd2/Vd1 is stored in the RAM 40, and used for verification explained later. The frequency response function Vd2/Vd1 indicates a ratio of the acceleration signal v2 detected by the acceleration sensor 15 to the oscillation signal v1 generated from the oscillation source. The frequency response function Vd2/Vd1 is compared with a reference frequency response function stored in the program in advance, and thereby the supporting state of the housing is estimated.

Figure 4:
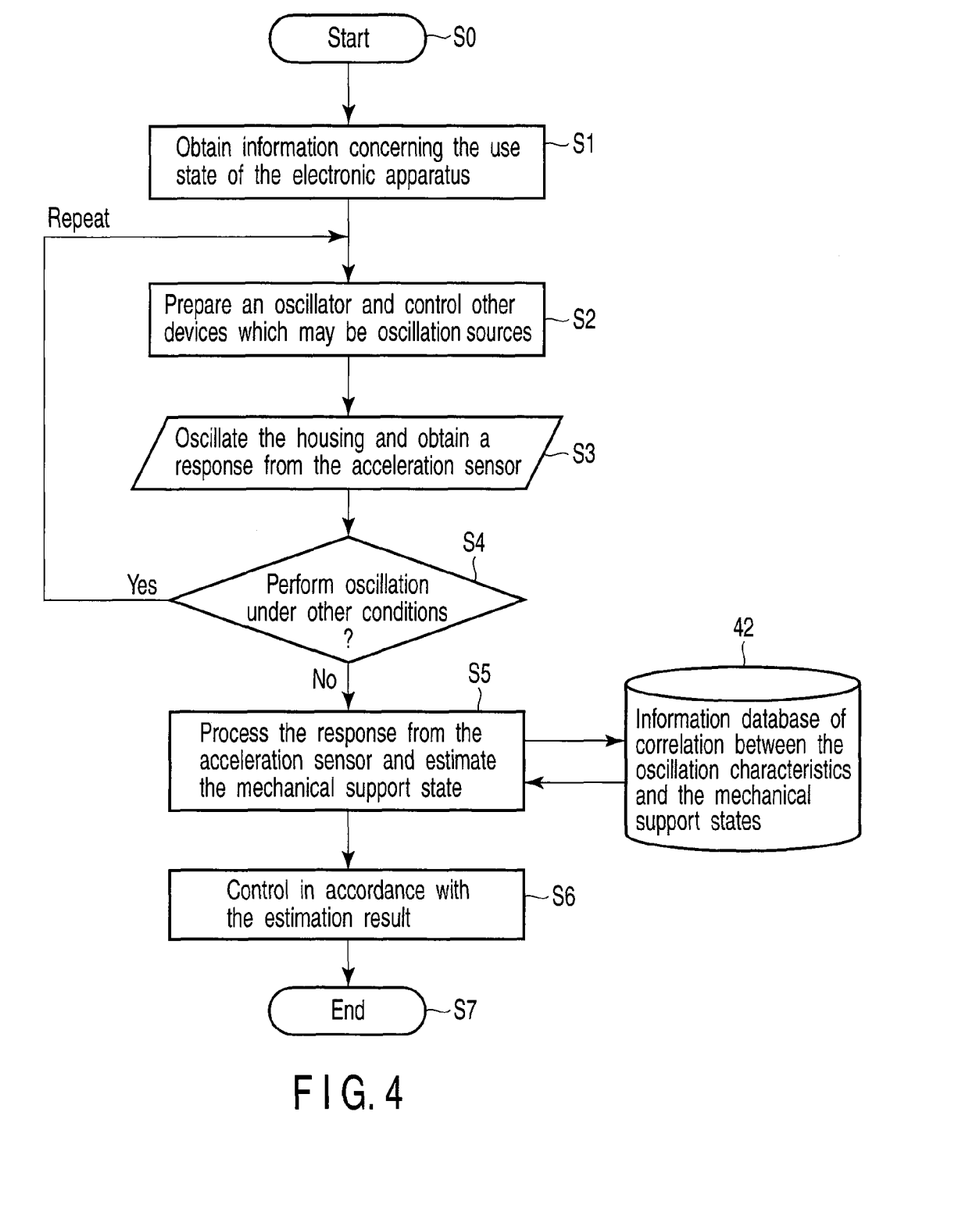
FIG. 4 is a flowchart illustrating a method of estimating a supporting state of a housing of the electronic apparatus in the electronic apparatus illustrated in FIGS. 1 and 2.

FIG. 4 is a flowchart illustrating a method of estimating the supporting state of the electronic apparatus housing according to the present invention. The method of estimating the supporting state of the notebook personal computer illustrated in FIGS. 1 and 2, which serves as the electronic apparatus, is explained with reference to FIGS. 4 to 9.

The method of estimating the supporting state illustrated in FIG. 4 is performed in accordance with the program stored in the RAM 40 illustrated in FIG. 3. In the method, when estimation of the supporting state of the notebook personal computer serving as the electronic apparatus is started as illustrated in step S0, first, information concerning the use state of the electronic apparatus is obtained as illustrated in step S1. Specifically, an open/close sensor (not shown) which detects whether the display panel 12 is opened or closed is provided on the housing 11, and the open/close state of the display panel 12 is determined according to the open/close signal from the open/close sensor. Further, it is determined whether there are any add-ons, such as an attachment added to the card slot 19. When the notebook personal computer is started up, the OS (operating system) installed in the notebook personal computer detects whether there is an attachment added to the card slot 19, and the state of the apparatus is stored in the RAM 40 as information concerning the use state of the apparatus. Since the use state of the apparatus has an influence on the stiffness of the whole notebook personal computer, the use state is used as a material for determination when an oscillating waveform for oscillating the electronic apparatus is selected, or when the supporting state of the electronic apparatus is estimated.

Figure 5:
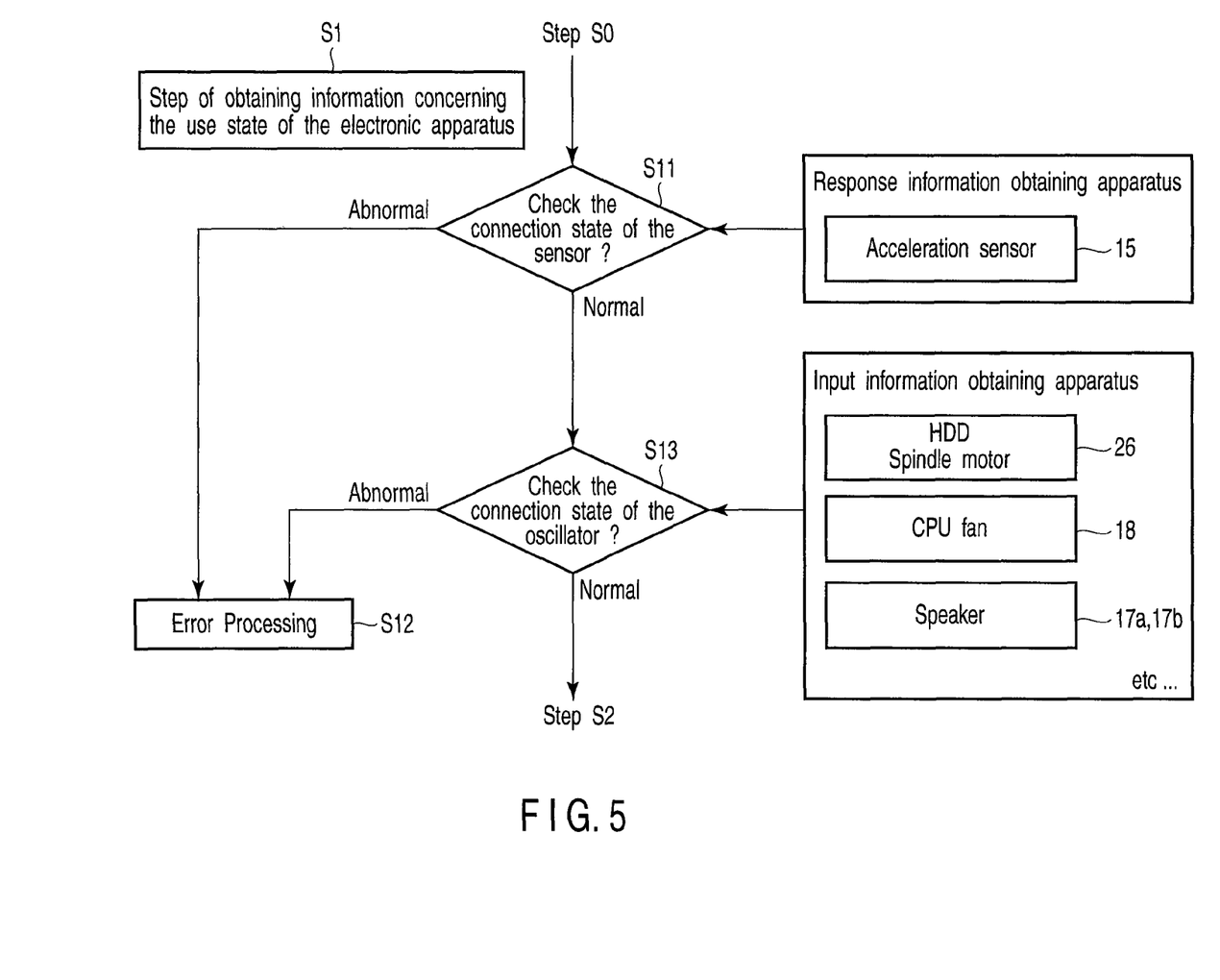
FIG. 5 is a flowchart illustrating details of step S1 of FIG. 4.

In obtaining information concerning the use state of the electronic apparatus illustrated in step S1, information concerning the use state of the electronic apparatus is obtained from the RAM 40. In addition, as illustrated in FIG. 5, the state of the acceleration sensor 15, that is, the connection state of the response information obtaining device is checked in step S11. In step S11, when the output from the acceleration sensor 15 is not normal and the connection state of the acceleration sensor is abnormal, error processing is performed as illustrated in step S12. When the state of the acceleration sensor 15 still cannot be determined also in step S12, estimation of the supporting state of the notebook personal computer is ended. When the connection state of the acceleration sensor 15 is normal, the connection state of the input information obtaining device such as the hard disk drive 16, the housing fan 18 or the CPU fan, and the speakers 17a and 17b serving as the oscillation source is checked in step S12. When the output from the input information obtaining device is not normal and the connection state is abnormal, error processing is performed as illustrated in step S12. When the connection state of the acceleration sensor 15 still cannot be determined also in step S12, estimation of the supporting state of the notebook personal computer is ended. When the connection state of the input information obtaining device is normal as illustrated in step S13, the apparatus goes to step S2.

Next, as illustrated in step S2, an oscillator serving as the oscillation source (speakers 17a and 17b, hard disk drive 16, and the housing fan 18 or the CPU fan) is prepared, and other devices which may be the oscillation sources (speakers 17a and 17b, hard disk drive 16, and the housing fan 18 or the CPU fan) are controlled. In this embodiment, suppose that the speakers 17a or 17b is used as the oscillator. The speakers 17a and 17b are provided in the right and left portions of the electronic apparatus. First, the notebook personal computer serving as the electronic apparatus is oscillated by the right speaker 17a. The other speaker 17b, or the hard disk drive 16 or the cooling fan 18 which can be other oscillation sources are set under the controlled state, and stopped or maintained at a fixed operation state.

Figure 6:
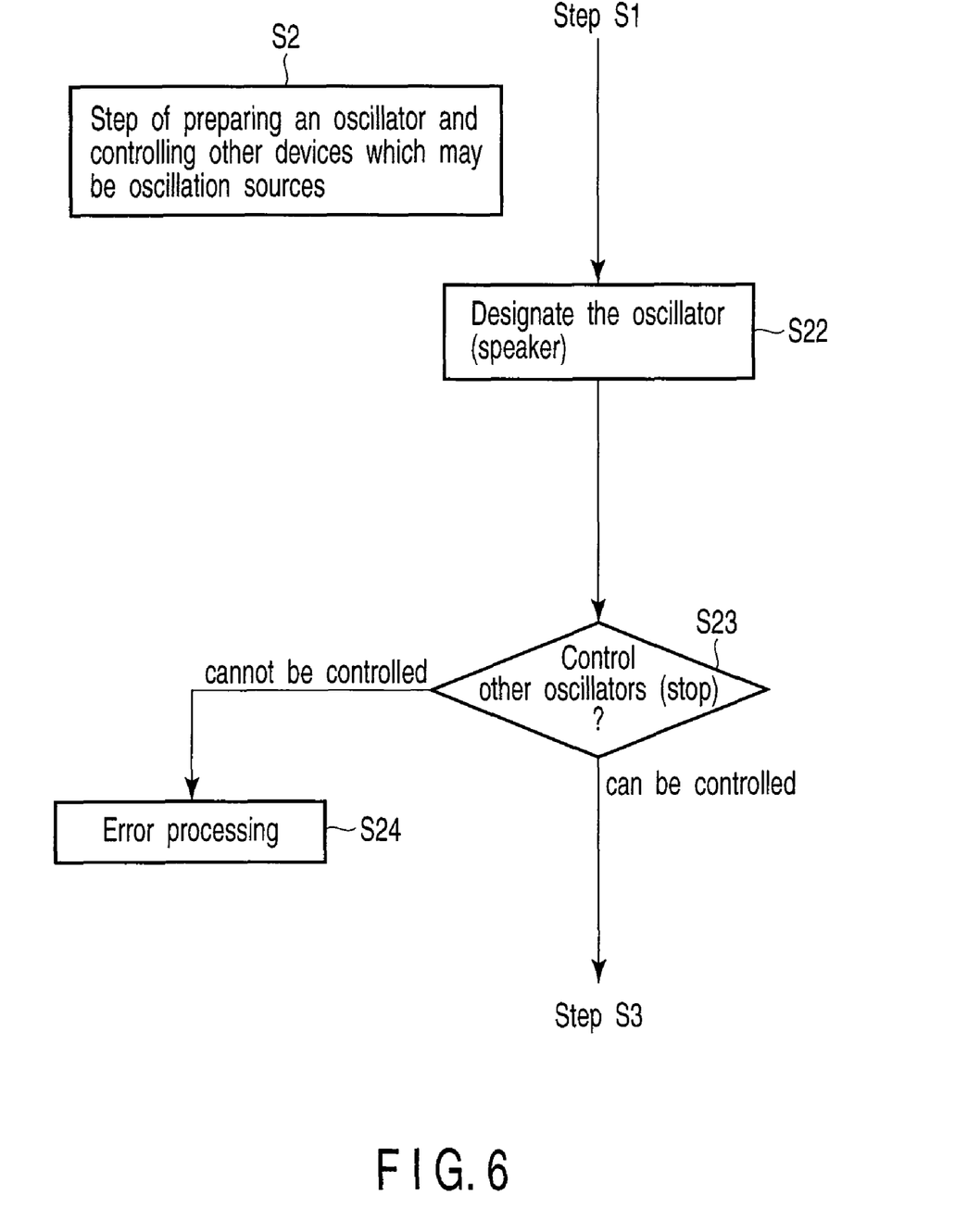
FIG. 6 is a flowchart illustrating details of step S2 of FIG. 4.

In step S2, more specifically, an oscillator being the oscillation source, for example, one of the speakers 17a and 17b is designated in step S22, as illustrated in FIG. 6. When the oscillator is designated, operations of oscillators being other oscillation sources, that is, the other of the speakers 17a and 17b, the hard disk drive 16, and the housing fan 18 or the CPU fan are controlled in step S23. In the control, operations of the other oscillators are temporarily stopped, or the other oscillators are operated under a fixed condition such that fluctuations of the oscillation characteristics thereof fall within a predetermined range.

When other oscillators cannot be controlled, error processing is performed as illustrated in step S24. When the other oscillators still cannot be controlled also in the error processing, estimation of the supporting state of the notebook personal computer is ended. The state where the other oscillation devices cannot be controlled includes operation in priority processing, such as the state where operation of the CPU fan cannot be stopped or the CPU cannot be operated at lower rotation speed. When the other oscillators being oscillation sources can be controlled in step S23, the apparatus goes to step S3.

Then, as illustrated in step S3, the electronic apparatus is oscillated by the oscillator, and the acceleration is detected by the acceleration sensor 15. To obtain a more accurate estimation result of the supporting state of the electronic apparatus, it is preferable to detect the acceleration under a plurality of conditions. Therefore, the above process illustrated in steps S2 and S3 is repeated with the oscillation condition varied, as illustrated in step S4. For example, in the first embodiment, an oscillation test using the left speaker 17b is performed after the oscillation test using the right speaker 17a.

Figure 7:
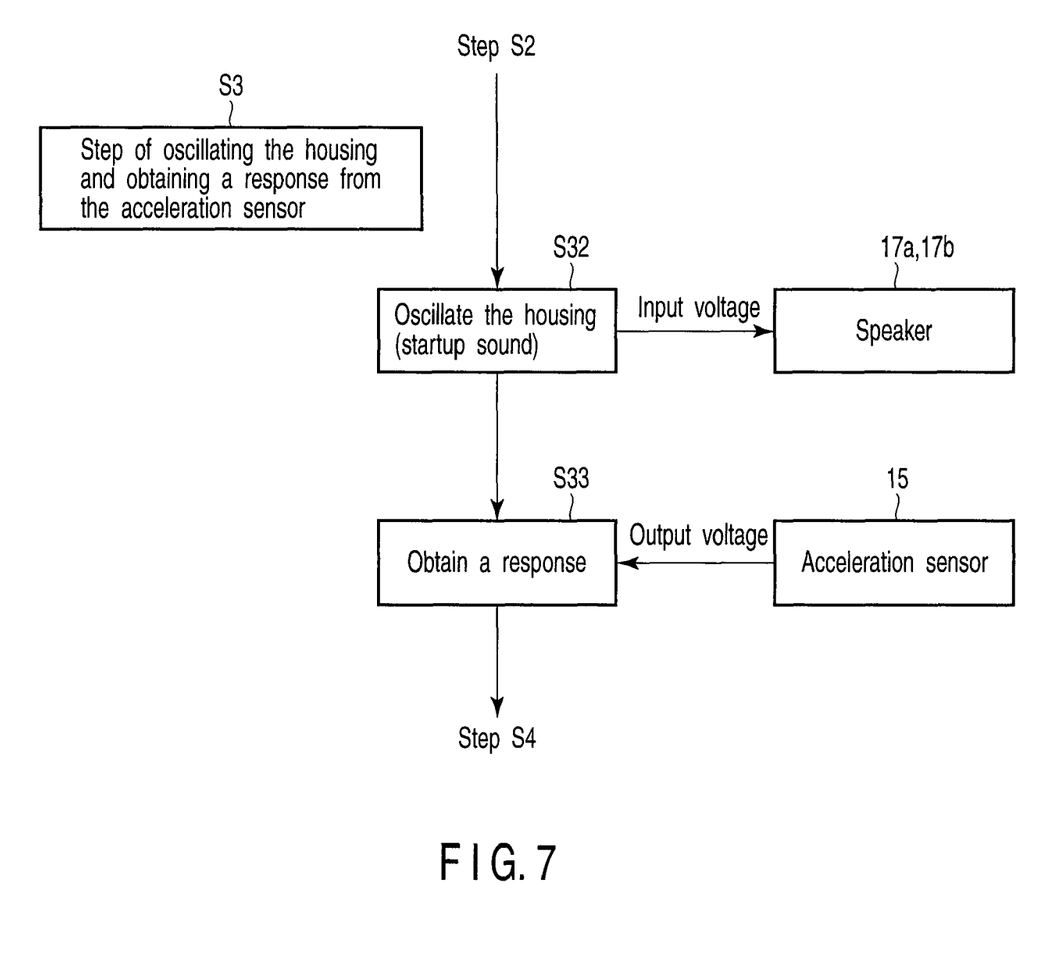
FIG. 7 is a flowchart illustrating details of step S3 of FIG. 4.

In step S3, more specifically, as illustrated in FIG. 7, an input voltage is applied to one of the speakers 17a and 17b as illustrated in step S32, to oscillate the housing 11. For example, a drive signal is supplied as an input voltage to one of the speakers 17a and 17b to generate a startup sound when the notebook personal computer is started. When the sound is generated from one of the speakers 17a and 17b, the oscillation is transmitted to the acceleration sensor 15 through the housing 11 and the printed circuit board 14. Therefore, as illustrated in step S33, an output voltage is generated from the acceleration sensor 15, and a response is obtained. Thereafter, the apparatus goes to step S4.

After the oscillation tests are ended, the response from the acceleration sensor 15 is processed, and the mechanical supporting state is estimated by analyzing the response as illustrated in step S5. In the processing of the response, the absolute value of the oscillation is measured, the frequency is analyzed, and a transfer function thereof is calculated. These results are compared with values of a correlation information database 42 which is stored in a storage device such as the RAM 40 and indicates correlation between the oscillation response characteristic and the mechanical supporting state. As a result of the comparison, the current mechanical supporting state of the electronic apparatus is estimated. Then, the notebook personal computer is controlled based on the estimation result as illustrated in step S6, and the processing is ended as illustrated in step S7.

Figure 8:
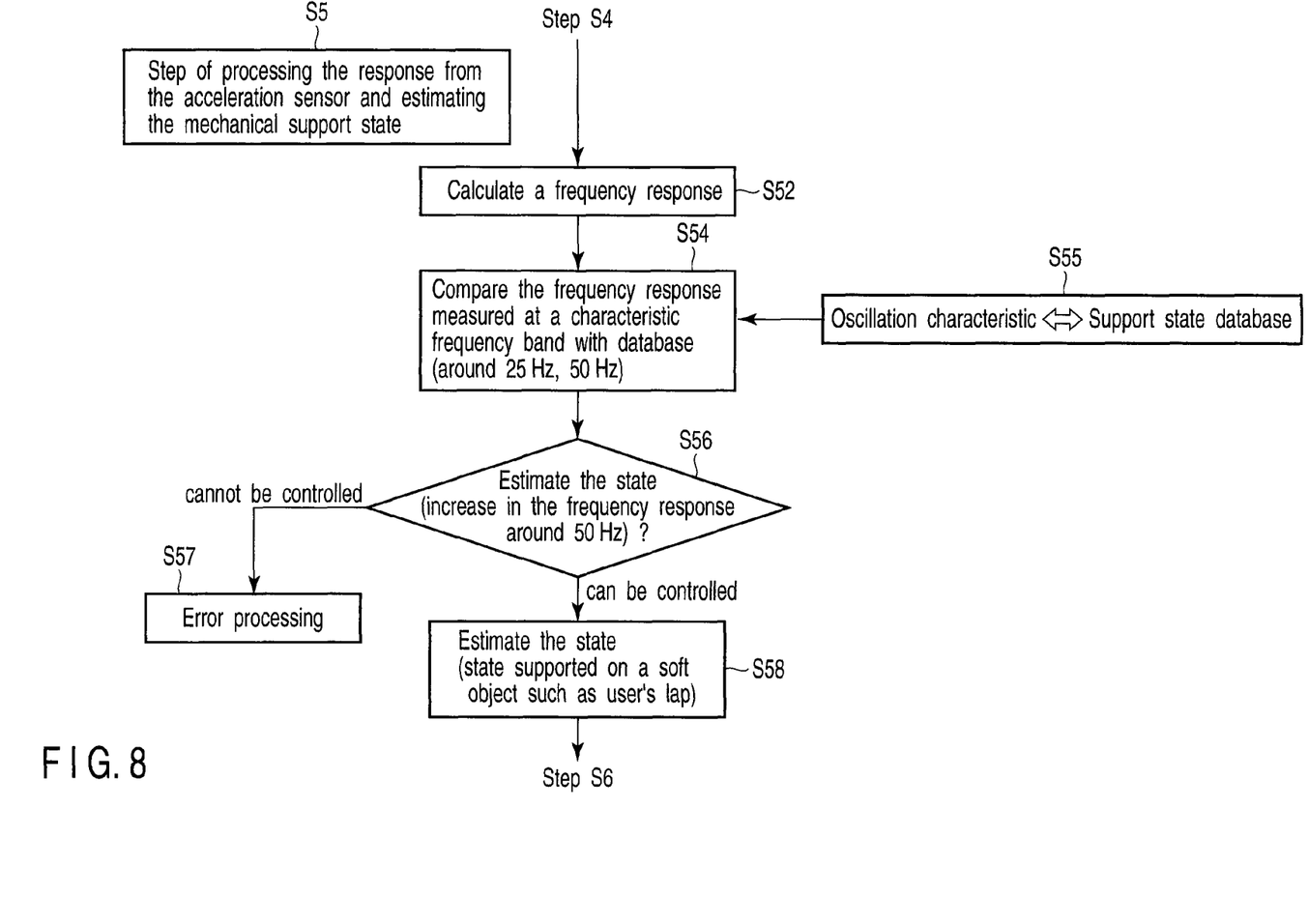
FIG. 8 is a flowchart illustrating details of step S5 of FIG. 4.

More specifically, as illustrated in FIG. 8, a frequency response Vd2/Vd1 is calculated as illustrated in step S52. Next, as illustrated in step S54, the frequency response Vd2/Vd1 measured in a characteristic frequency band is compared with data in the database 42. As explained later with reference to FIG. 10, in step S54, the frequency responses Vd2/Vd1 around 25 kHz and around 50 kHz are compared with respective reference frequency characteristics as data in the database 42. In the comparison, as illustrated in step S55, reference frequency characteristics in accordance with the supporting states of the housing 11 are prepared in the database.

Figure 10:
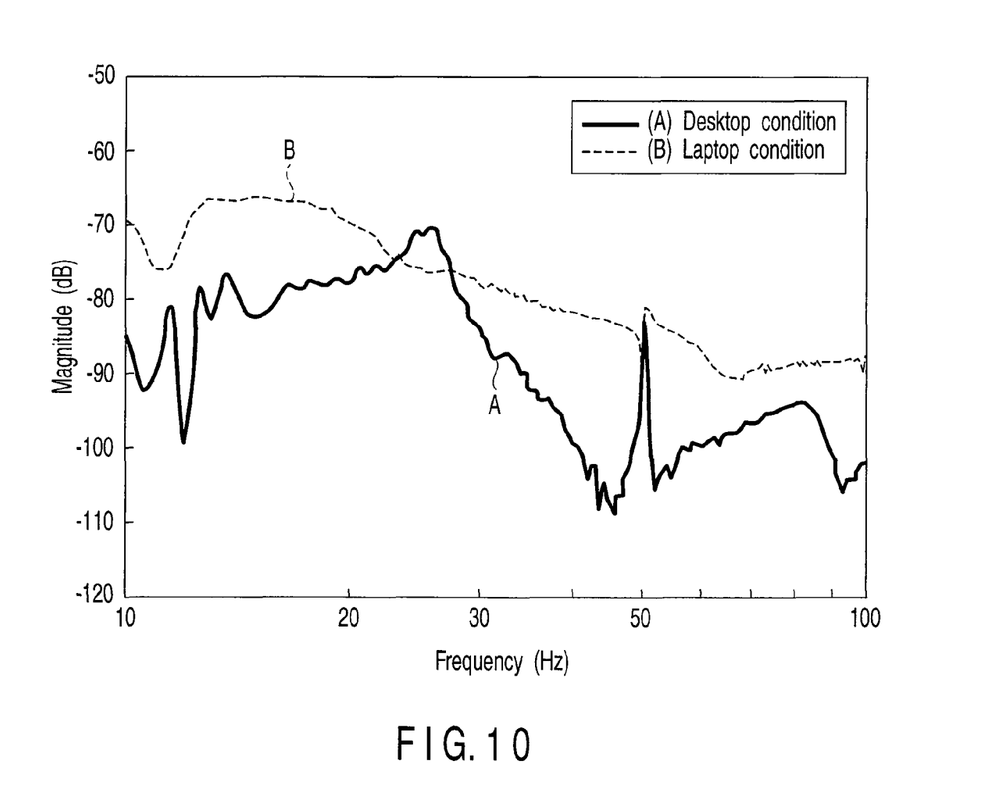
FIG. 10 is a graph illustrating transfer functions relating to the method of estimating the supporting state of the electronic apparatus housing according to the first embodiment of the present invention.

As the reference frequency characteristics, prepared are data which can be expressed as graphs of transfer functions from the speaker 17 to the acceleration sensor 15 as illustrated in FIG. 10 as an example. FIG. 10 illustrates transfer functions from the speaker 17 to the acceleration sensor 15 (transfer functions with which the applied power is transferred as acceleration). In FIG. 10, the horizontal axis indicates the frequency (Hz), and the vertical axis indicates the magnitude (dB) of oscillation. In FIG. 10, graph A indicates the transfer function under the standard desktop condition in which the electronic apparatus is placed on a flat surface such as a desktop, and graph B indicates the transfer function under the laptop condition in which the notebook personal computer is used on the lap 22 as illustrated in FIG. 2. Specifically, the graph A indicates the transfer function under the desktop condition in which the electronic apparatus is placed on a desktop as illustrated in FIG. 1, and the graph B indicates the transfer function under the laptop condition in which the electronic apparatus is placed on the user's lap as illustrated in FIG. 2. As indicated by the graph A, the transfer function under the desktop condition has a resonance of the main body housing 11 around 25 Hz, and has a clear resonance of the printed circuit board 14 around 50 Hz. On the other hand, as indicated by the graph B, the transfer function under the laptop condition does not have a clear peak, although it has a resonance of the main body housing 11 around 18 Hz and a resonance of the printed circuit board 14 around 50 Hz. Under the laptop condition, since the housing 11 is supported by the bottom surface of the housing 11, not by the leg portions 20, the resonance of the main body housing 11 is lowered, and the peak becomes unclear due to increase of attenuation.

The characteristic amounts of transfer functions as described above are input and stored in the correlation information database 42 in advance. Therefore, it is possible to estimate whether the electronic apparatus is in the standard state of being placed on a flat surface such as a desktop, or the electronic apparatus is in a special state of being placed on a soft uneven surface such as the user's lap, by referring to the correlation information database 42 in step S4 illustrated in FIG. 4, more specifically in step 56.

After step S54, the corresponding supporting state of the housing 11 is estimated in step S56 on the basis of the comparison result of the oscillation characteristics. When the estimation is impossible, such as in the case where no reference frequency characteristic corresponding to the frequency response Vd2/Vd1 is found with reference to the correlation information database 42, it is determined that estimation is impossible and error processing is performed in step S57. When estimation is possible in step S56, such as in the case where the frequency response Vd2/Vd1 has a clear peak around 50 Hz as indicated by the graph A of FIG. 10 and the waveform thereof almost corresponds to the reference frequency characteristic of the desktop condition, it is estimated that the notebook personal computer is placed on a flat surface. Further, for example, when the frequency response Vd2/Vd1 slightly increases around 50 Hz and the change of the waveform is mild and almost corresponds to the reference frequency characteristic of the laptop condition, it is estimated that the notebook personal computer is placed on a soft support object such as laptop. When estimation is possible, the estimation is determined in step S58, and the apparatus goes to step S6.

Figure 9:
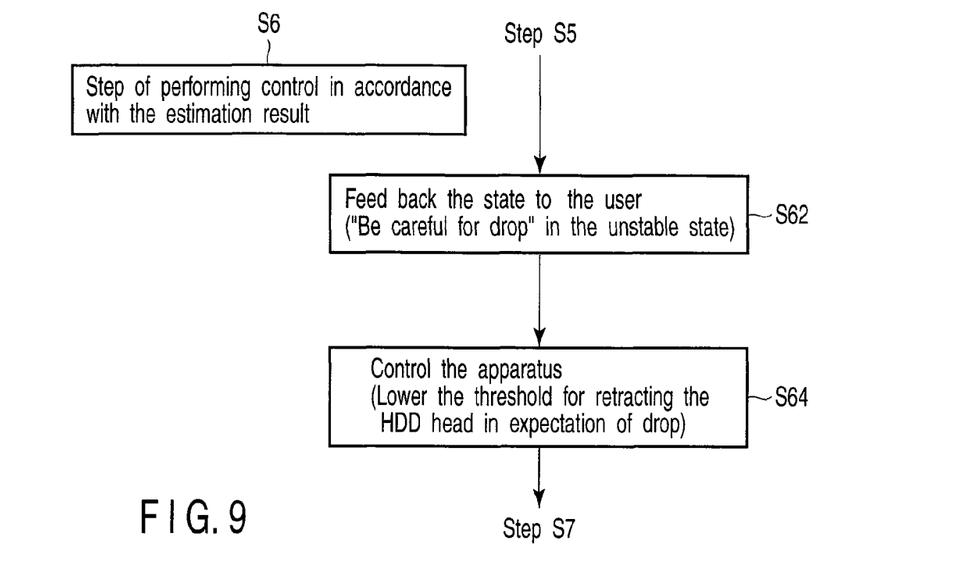
FIG. 9 is a flowchart illustrating details of step S6 of FIG. 4.

In step S6, it is determined based on the estimation whether standard control is performed for heat radiation and the auxiliary storage device, or special control is performed for heat radiation and the auxiliary storage device. When it is estimated that the electronic apparatus is in the laptop supporting state of being used on the lap 22, heat radiation is controlled to restrict the heat radiation amount toward the housing bottom surface, for example. Further, when the laptop supporting state is estimated, it is determined that it is desirable to control the auxiliary storage device in preparation for unexpected impact as illustrated in FIG. 9, as an example. As an example, since the notebook personal computer is used in an unstable state for the user, a warning such as "Be Careful for Drop" is displayed on the display panel 12, and thereby the state of the notebook personal computer is fed back to the user, as illustrated in step S62. Further, the device such as the hard disk 26 is controlled according to necessity as illustrated in step S64. In control of the hard disk 26, the retraction threshold value for starting operation of retracting the head of the hard disk 26 in expectation of drop of the notebook personal computer is lowered, such that the head of the hard disk 26 is retracted with a slight impact. The control secures safe use of the notebook personal computer.

When control of the device is performed in step S64, the whole processing is ended as illustrated in step S7.

In the above estimation, the case where the electronic apparatus is placed on the user's lap is explained as the special state. However, when a characteristic amount of the transfer function in the case where the electronic apparatus is used on a soft footcloth such as a carpet or other special circumstances is input and stored in the correlation information database 42 in advance, it is possible to estimate such special circumstances. Further, the correlation between the reference oscillation response characteristics and the mechanical supporting states preferably includes the characteristics amounts of the transfer functions of oscillation from the oscillation position to the position of the acceleration sensor as parameters, and correlation between them is preferably prepared in the correlation information database 42 for each parameter.

Further, the correlation between the prestored reference oscillation characteristics and the mechanical supporting states is preferably calibrated for each apparatus in, for example, shipment of the product, to remove the influence of individual difference. Furthermore, to remove the influence of deterioration over time of the product, it is desirable that the correlation is periodically calibrated, for example, in the state where the apparatus is placed on a stiff flat surface. When a response which is greatly different from that at the time of shipment of the product is detected in the calibration operation during use of the apparatus, it is possible to detect that there is a critical defect or malfunction in the mechanical connecting structure of the apparatus.

As described above, according to the method of estimating the supporting state of the electronic apparatus of the first embodiment, it is possible to estimate the supporting state of the housing in the static state, which is difficult in prior art, with comparative ease, without adding a new special internal device.

According to the embodiment of the invention described above, it is possible to provide a method of estimating the supporting state of the electronic apparatus housing and an electronic apparatus, which can estimate the mechanical support structure of the housing of the electronic apparatus at practical cost, even if the apparatus is in a static state.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:

a housing configured to receive the electronic apparatus;

an oscillation device which generates first oscillation in accordance with a drive signal to apply the oscillation to the housing;

an oscillation sensor which senses second oscillation transmitted to the housing in response to the first oscillation to output a sensor signal;

an processing section which determines a measurement response characteristic based on the drive signal and the sensor signal;

a storing section which stores reference response characteristics which are correlated with mechanical supporting states of the electronic apparatus, respectively;

a comparing section which compares the measurement response characteristic with the reference response characteristics to determine one of the reference response characteristics; and estimating one of the supporting states of the housing in accordance with the one of the reference response characteristics.

2. An electronic apparatus according to claim 1, wherein the oscillation device is a speaker.

3. An electronic apparatus according to claim 1, wherein the oscillation device is a motor of a storage device.

4. An electronic apparatus according to claim 1, wherein the oscillation device is a motor of a cooling fan.

5. An electronic apparatus according to claim 1, wherein the reference response characteristic are prepared for each use state of the electronic apparatus.

6. An electronic apparatus according to claim 5, wherein the use state of the electronic apparatus includes an open/close state of a display panel and a connection state of an attachment.

7. An electronic apparatus according to claim 5, wherein each of the reference response characteristics includes a parameter of a transfer function of oscillation transferred from an oscillation position to a position of an acceleration sensor.

* * * * *